(12) United States Patent
Nam

(10) Patent No.: US 6,275,375 B1
(45) Date of Patent: *Aug. 14, 2001

(54) MONITOR STAND WITH HUB MOUNT

(75) Inventor: Sang-Su Nam, Suwon (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,923

(22) Filed: Nov. 26, 1997

(30) Foreign Application Priority Data

Jan. 10, 1997 (KR) .................................. 97-256 U

(51) Int. Cl.[7] ................ G06F 1/16; H05K 5/02; A47G 29/00
(52) U.S. Cl. .................... 361/682; 361/688; 248/371; 248/923; 248/346.06
(58) Field of Search .................. 361/682, 683, 361/681, 679, 688; 248/371, 923, 183.1, 917, 349.1, 346.06; D14/114, 113; 364/708.1

(56) References Cited

U.S. PATENT DOCUMENTS

| | | |
|---|---|---|
| 3,675,083 | 7/1972 | White . |
| 4,388,671 * | 6/1983 | Hall et al. ........................ 361/683 |
| 4,547,027 * | 10/1985 | Scheibenreif .................. 248/340.1 |
| 4,781,347 * | 11/1988 | Dickie ............................ 248/183.1 |
| 5,097,388 | 3/1992 | Buist et al. . |
| 5,242,314 | 9/1993 | Di Giulio et al. . |
| 5,311,397 * | 5/1994 | Harshberger et al. ............. 361/683 |
| 5,335,142 * | 8/1994 | Andersom ........................ 361/681 |
| 5,466,165 | 11/1995 | Boesel et al. . |
| 5,484,303 | 1/1996 | Cheng . |
| 5,569,052 | 10/1996 | Belt et al. . |
| 5,569,895 * | 10/1996 | Lynch et al. ...................... 235/1 R |
| 5,588,625 * | 12/1996 | Beak ................................... 248/371 |
| 5,608,608 | 3/1997 | Flint et al. . |
| 5,675,813 * | 10/1997 | Holmdahl ........................... 713/310 |
| 5,729,430 * | 3/1998 | Johnson ............................. 361/682 |
| 5,779,212 * | 7/1998 | Baek ................................... 248/371 |
| 5,784,581 * | 7/1998 | Hannah .............................. 395/290 |
| 5,799,196 * | 8/1998 | Flannery ....................... 395/750.03 |
| 5,854,905 * | 12/1998 | Garney ............................... 395/284 |
| 5,871,368 | 2/1999 | Erdner et al. . |
| 5,890,015 * | 3/1999 | Garney et al. .................... 395/882 |
| 5,978,211 * | 11/1999 | Hong ................................... 361/683 |
| 6,000,042 | 12/1999 | Genrie . |
| 6,032,918 * | 3/2000 | Cho ..................................... 361/682 |

* cited by examiner

*Primary Examiner*—Leo P. Picard
*Assistant Examiner*—Jagdish Patel
(74) *Attorney, Agent, or Firm*—Robert E. Bushnell, Esq.

(57) ABSTRACT

A monitor stand, provided with a hub mount suitable for exteriorly mounting a universal serial bus (USB) hub used for connecting various peripheral equipment to a computer, is disclosed. The monitor stand has a USB hub including top and bottom covers with a USB printed circuit board being interposed between the top and bottom covers. The hub mount is formed at a predetermined position of the stand and has a hub cavity for receiving the USB hub. The stand also has a means for holding the USB hub inside the hub mount, with the USB hub being recessed into the hub mount.

23 Claims, 7 Drawing Sheets

MONITOR STAND WITH HUB MOUNT

CLAIM OF PRIORITY

This application makes reference to, incorporates the same herein, and claims all benefits accruing under 35 U.S.C. §119 from an application for Monitor Stand With Hub Mount earlier filed in the Korean Industrial Property Office on Jan. 10, 1997 and there duly assigned Serial No. 256/1997.

FIELD OF THE INVENTION

The present invention relates, in general, to a monitor for computer systems with multimedia functions and, more particularly, to a monitor stand with a hub mount suitable for exteriorly and selectively mounting a universal serial bus hub used for connecting various peripheral equipment such as a telephone, modem, printer, microphone, speaker, scanner, game pad, etc. to a computer.

DESCRIPTION OF THE PRIOR ART

In accordance with active development of various applied programs, recently marketed computers are provided with multimedia functions. Such computers, particularly, personal computers are used with various peripheral equipment such as a telephone, telephone network, modem, printer, microphone, digital speaker, joy stick, mouse, scanner, game pad, digital camera, etc.

In order to use such various peripheral equipment with a computer, associated cards are installed in the computer and there requires an increase in the capacity and size of the computer. In addition, when it is necessary to add or change peripheral equipment, the computer has to be disassembled thus being inconvenient to users.

In an effort to overcome the above problem, a universal serial bus (hereinbelow, referred to simply as "USB") is used for effectively connecting the peripheral equipment to a computer without disassembling the computer. Such a USB is actively developed and marketed recently by manufacturers associated with personal computer and telephone industries, thus allowing users to more effectively and conveniently use the peripheral equipment with computers irrespective of exceedingly enlarged capacity of the peripheral equipment due to active development of various applied programs.

The USB removes the necessity for disassembling a computer while connecting cards associated with peripheral equipment to the computer. In other words, an additional connection of peripheral equipment to a computer is completely accomplished by inserting the connector of an associated cable into a connection port of the USB prior to driving the peripheral equipment.

In the earlier art, the USB is typically installed inside a monitor or a computer so that it is necessary to form a cavity for the USB inside the monitor or computer. However, such a cavity forces the structure of the monitor or computer to be altered in design, thus increasing manufacturing costs.

Another problem of such an interior USB installed in a monitor or computer resides in that the USB forces excessive costs on the owner of the monitor or computer, who may not require the use of such a USB. A further problem experienced in such an interior USB is that the managing or repairing of the USB requires the disassembling of the monitor or computer.

U.S. Pat. No. 5,569,052 for a Computer For Use With a Port Replicator to Belt et al. discloses a port replicator for the efficient connecting and disconnecting of peripheral devices to a computer. However, the invention disclosed in Belt et al '052 does not mention the use of a Universal Serial Bus (USB). Also, the invention in Belt et al '052 pertains to a notebook computer and not to a computer monitor.

SUMMARY OF THE INVENTION

Accordingly, the present invention has been made keeping in mind the above problems occurring in the earlier art, and an object of the present invention is to provide a monitor stand, which is provided with a hub mount suitable for exteriorly mounting a USB hub used for connecting various peripheral equipment to a computer.

Another object of the present invention is to provide a monitor stand, which is provided with a hub mount suitable for selectively mounting a USB hub without disassembling a monitor or computer.

In order to accomplish the above object, the present invention provides a monitor with a monitor stand on its bottom, wherein the monitor stand comprises: a universal serial bus (USB) hub including top and bottom covers with a USB printed circuit board being interposed between the top and bottom covers; a hub mount formed at a predetermined position of the stand and having a hub cavity for receiving the USB hub; and means for holding the USB hub inside the hub mount, with the USB hub being recessed into the hub mount.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 2:
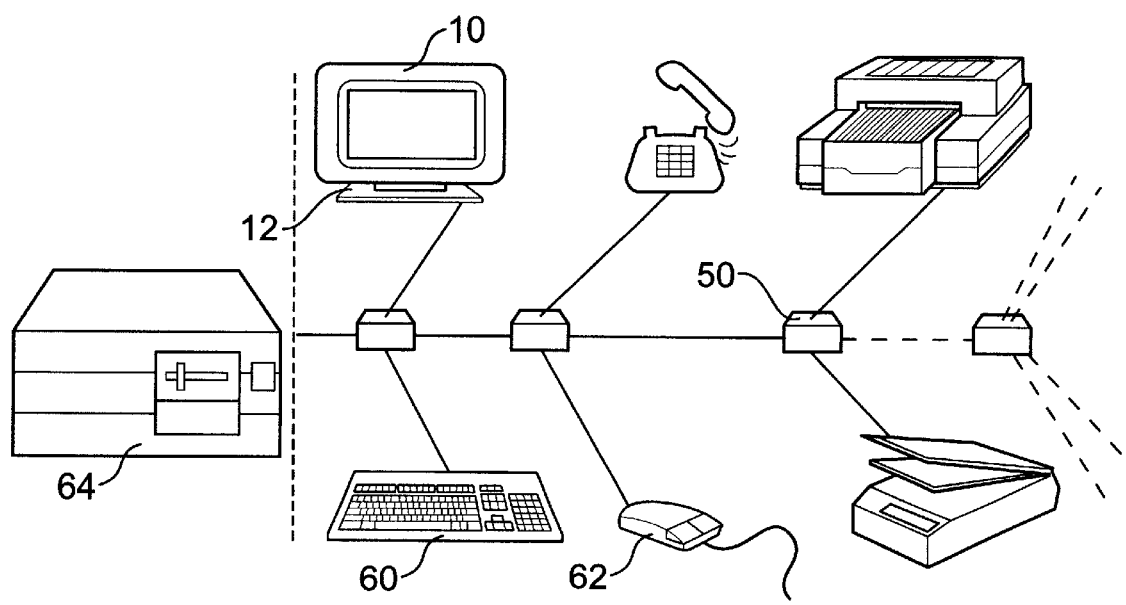
FIG. 2 is a view showing a separate USB, which is not installed in a monitor or computer but is encased separately.

As shown in FIG. 2, a separate USB 50, which is not installed in a monitor 10 or in a computer 64, but is encased separately, is proposed and used. However, the separate USB 50 is installed outside a computer system thus being inconvenient to a user.

Figure 1:
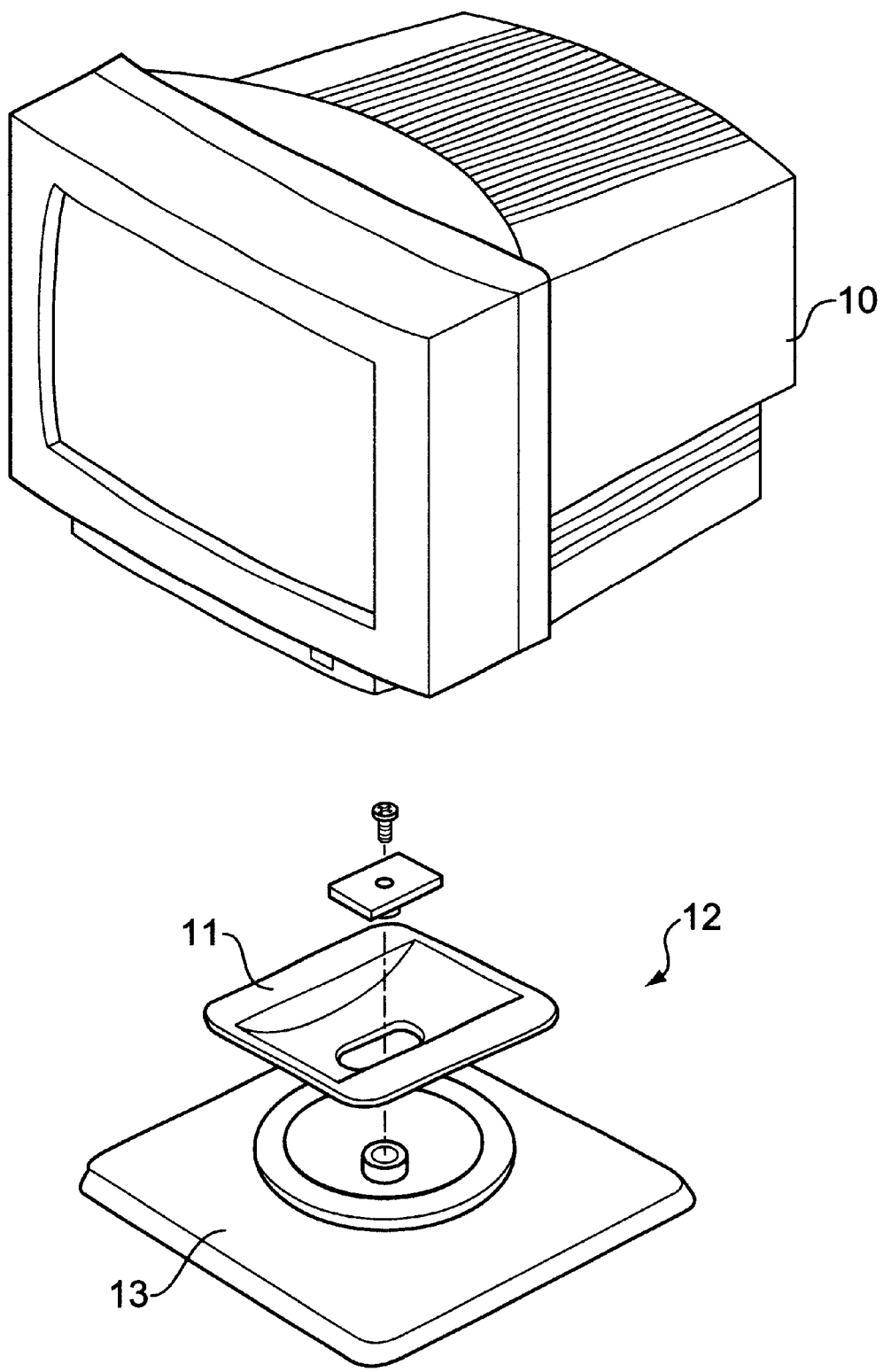
FIG. 1 is an exploded perspective view of a monitor stand.

FIG. 1 is an exploded perspective view showing a monitor stand for holding a monitor. As shown in the drawing, the monitor stand 12 is made up of a stand top 11, which is convex downward and is mounted to the bottom of the monitor. The convex center of the stand top 11 is hinged onto the concave center of a stand bottom 13 laid on the support surface so that the monitor 10 with the stand top 11 is can be tilted relative to the stand bottom 13 at a predetermined tilting angle, thus allowing a user to adjust the angle of the monitor 10 as desired. However, the monitor stand only holds the monitor 10 while allowing the monitor 10 to be tilted.

Figure 3:
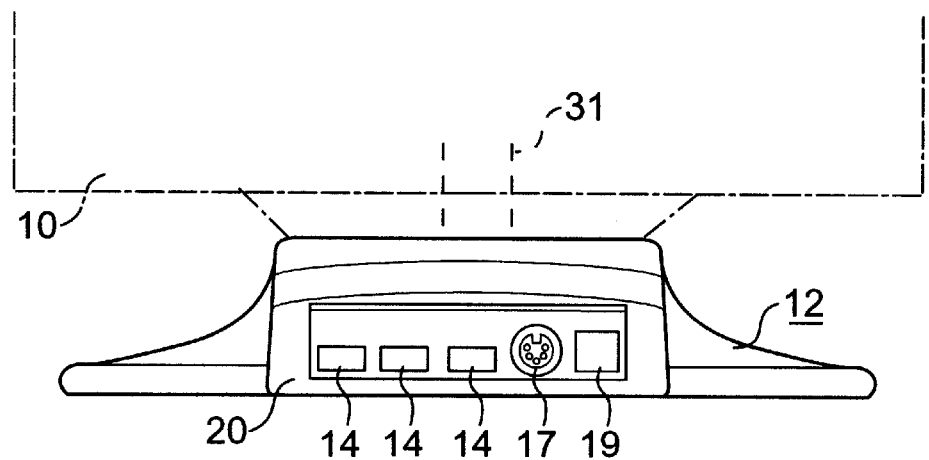
FIG. 3 is a bottom view of a monitor stand with a hub mount in accordance with the preferred embodiment of the present invention.

FIG. 3 is a bottom view of a monitor stand with a hub mount in accordance with the preferred embodiment of the present invention. As shown in the drawing, the box-shaped hub mount 20 is integrally formed at a side bottom of the monitor stand 12 and has a hub cavity 23, which opens downward and is to receive a USB hub 50 as will be described later herein with reference to FIG. 5. A plurality of, for example, three down-stream ports 14, a monitor connection port 17 and an up-stream port 19 are arranged on the front wall of the hub mount 20. The down-stream ports 14 are for connecting various peripheral equipment such as a keyboard 60, mouse 62 and camera to the USB hub 50, while the monitor connection port 17 is for connecting the USB hub 50 to the monitor 10 thus allowing both electric power for the USB hub 50 and monitor control signals to be input or output. The up-stream port 19 is for connecting the USB hub 50 to the computer 64.

Figure 4:
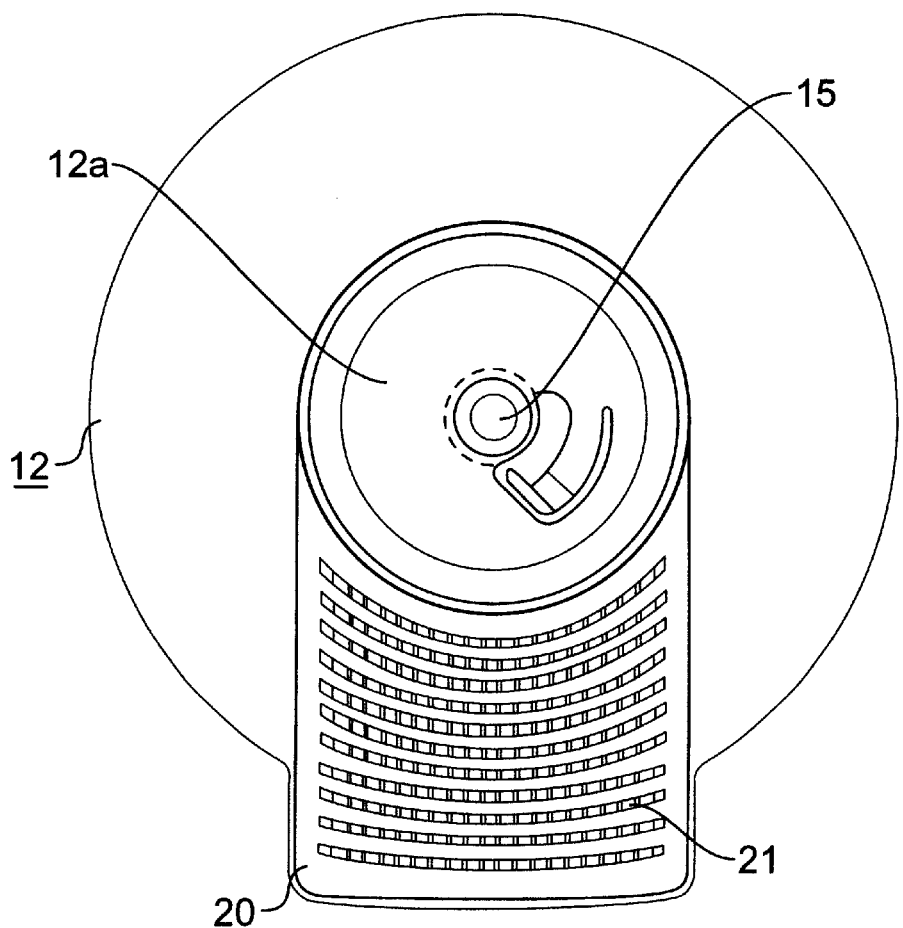
FIG. 4 is a plan view of the monitor stand according to the preferred embodiment of this invention.

FIG. 4 is a plan view of the monitor stand 12 of FIG. 3. As shown in FIG. 4, a concave circular surface 12a is formed at the top of the stand 12 and movably holds the monitor 10 so that the monitor 10 can be tilted relative to the stand 12 at a predetermined tilting angle, thus allowing a user to adjust the angle of the monitor 10 in the same manner as described in the earlier art. The center of the concave surface 12a is provided with a cable hole 15, through which a plurality of cables 30 pass without being twisted and tangled while the monitor 10 is tilted on the stand 12. Monitor 10 has cable hole 31 mounted on its underside over cable hole 15. The interior ports of the stand 12 are thus effectively connected to associated interior ports of the monitor 10 by means of the cables which pass through both the hole 15 of the stand 12 and a hole (not shown) formed at the bottom of the monitor 10. The top wall of the hub mount 20 is perforated regularly thus forming a plurality of heat dissipating holes 21.

Figure 5:
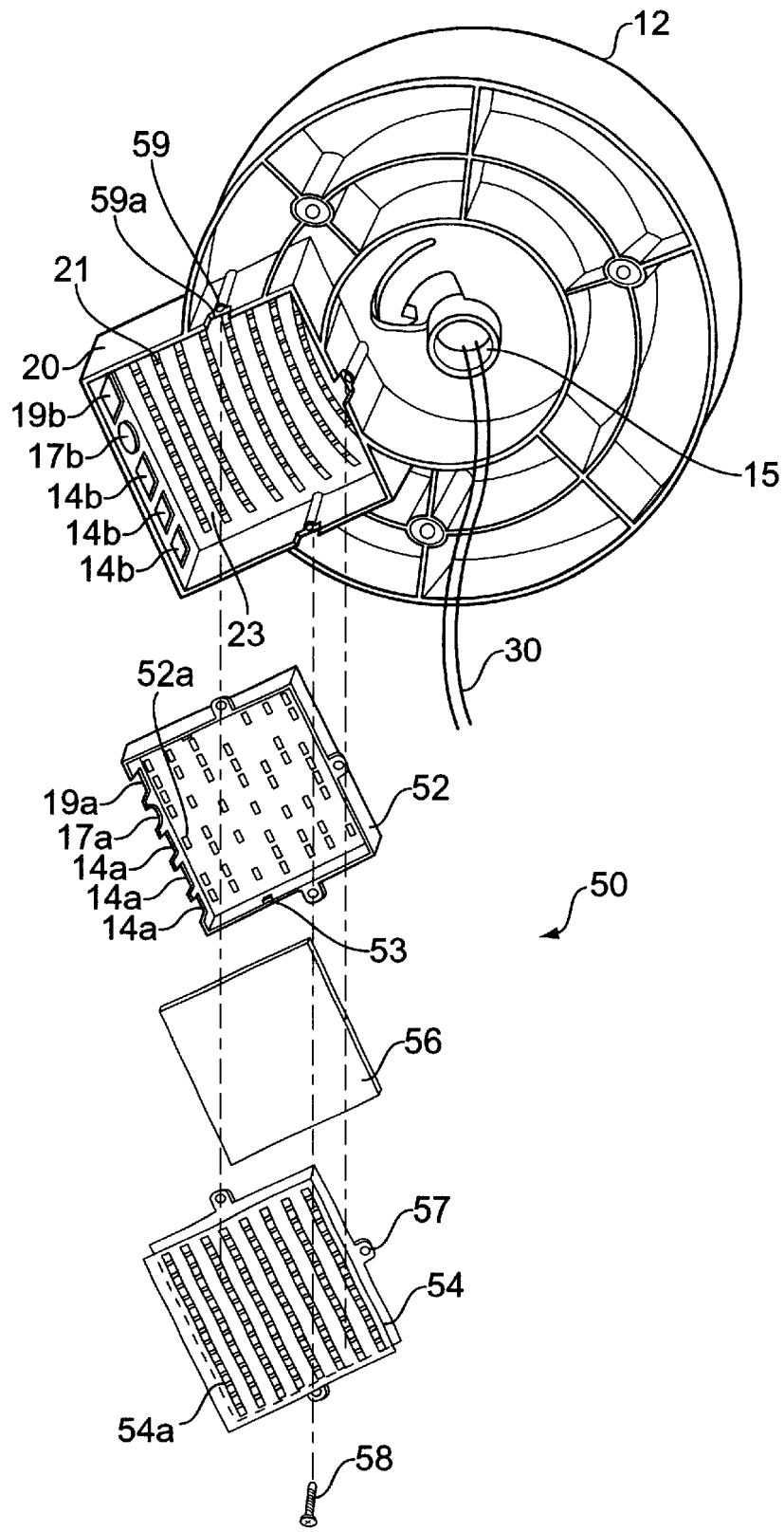
FIG. 5 is an exploded bottom perspective view showing a USB hub mounted to the hub mount of the monitor stand according to the preferred embodiment of this invention.

FIG. 5 show the USB hub 50 to be mounted to the hub mount 20 of the monitor stand 12 according to the preferred embodiment of this invention. The USB hub 50 includes two flat box-shaped covers: a top cover 52 and a bottom cover 54 with a USB printed circuit board (USB PCB) 56 being interposed between the two covers 52 and 54. The USB hub 50 is bolted to a plurality of bosses 59 of the hub mount 20 using a plurality of lock bolts 58. The bosses 59 are formed on the side walls of the hub mount 20, with a notch 59 being formed on the lower edge of the hub 20 at a position corresponding to each boss 59. A plurality of screw-holed flanges 57 are formed on each of the top and bottom covers 52 and 54 at positions corresponding to the bosses 59 of the mount 20. The flanges 57 of each cover 52, 54 are seated in the notches 59a of the hub mount 20 prior to screwing each cover 52, 54 to the mount 20.

Figure 6:
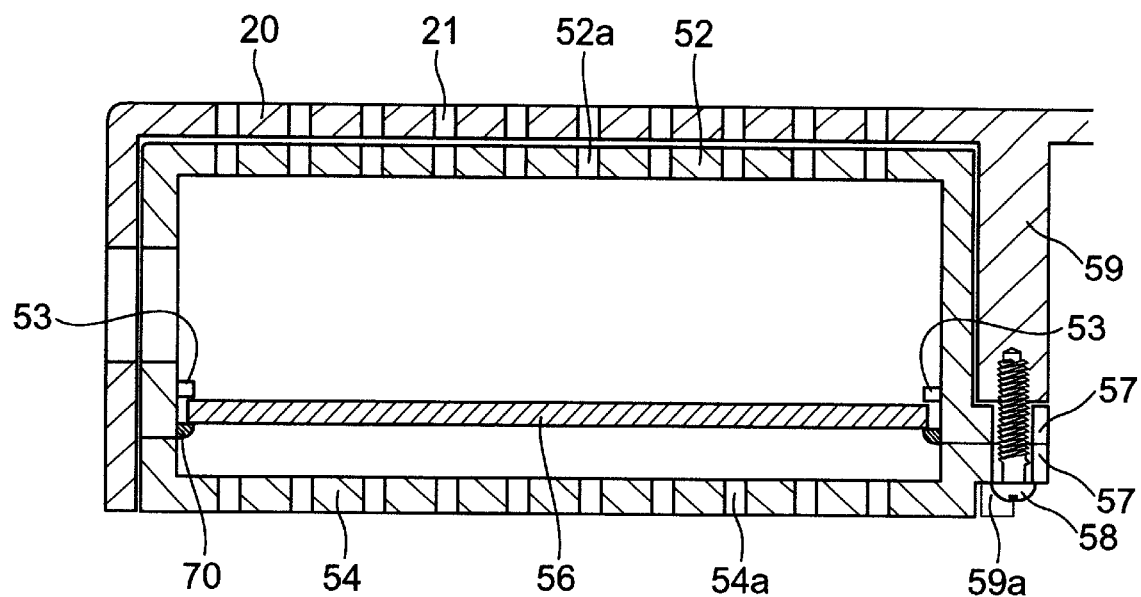
FIG. 6 is a side sectional view of the USB hub assembled with the hub mount of the monitor stand of FIG. 5.

Due to such an engagement of the flanges 57 with the notches 59, the USB hub 50 is recessed into the cavity 23 of the hub mount 20 as shown in FIG. 6 so that the monitor stand 12 can be stably laid on a flat support surface with the bottom cover 54 of the hub 50 being not brought into contact with the support surface. Meanwhile, a plurality of stop protrusions 53 are formed on the interior side wall of the top cover 52 and hold the USB PCB 56. One side wall of the top cover 52 is provided with a plurality of notches 14a, 17a and 19a, which are aligned with a plurality of holes 14b, 17b, and 19b, which are formed at positions corresponding to the down-stream ports 14, monitor connection port 17 and up-stream port 19 of the hub mount 20 respectively. Therefore, the first notches 14a are aligned with the down-stream ports 14 and allow various peripheral equipment such as the keyboard 60, mouse 62 and camera to be connected to the USB hub 50. The second notch 17a is aligned with the monitor connection port 17 and allows the USB hub 50 to be connected to the monitor 10. Meanwhile, the third notch 19a is aligned with the up-stream port 19 and allows the USB hub 50 to be connected to the computer 64. In the monitor stand 12, the position of the hub mount 20 may be changed in accordance with the type of monitor 10.

FIG. 6 shows the USB hub 50, which is assembled with the hub mount 20 of the monitor stand 12. In order to mount the USB hub 50 to the hub mount 20, the USB PCB 56 is primarily seated in the top cover 52 until the PCB 56 is stopped by the protrusions 53. Thereafter, the PCB 56 is fixed by applying solder 70 to the lower portion of the cover 52. The edges of USB PCB are sandwiched between the solder 70 and the protrusions 53. The top wall of the top cover 52 is perforated to form a plurality of heat dissipating holes 52a, while the bottom wall of the bottom cover 54 is perforated to form a plurality of heat dissipating holes 54a.

Figure 7:
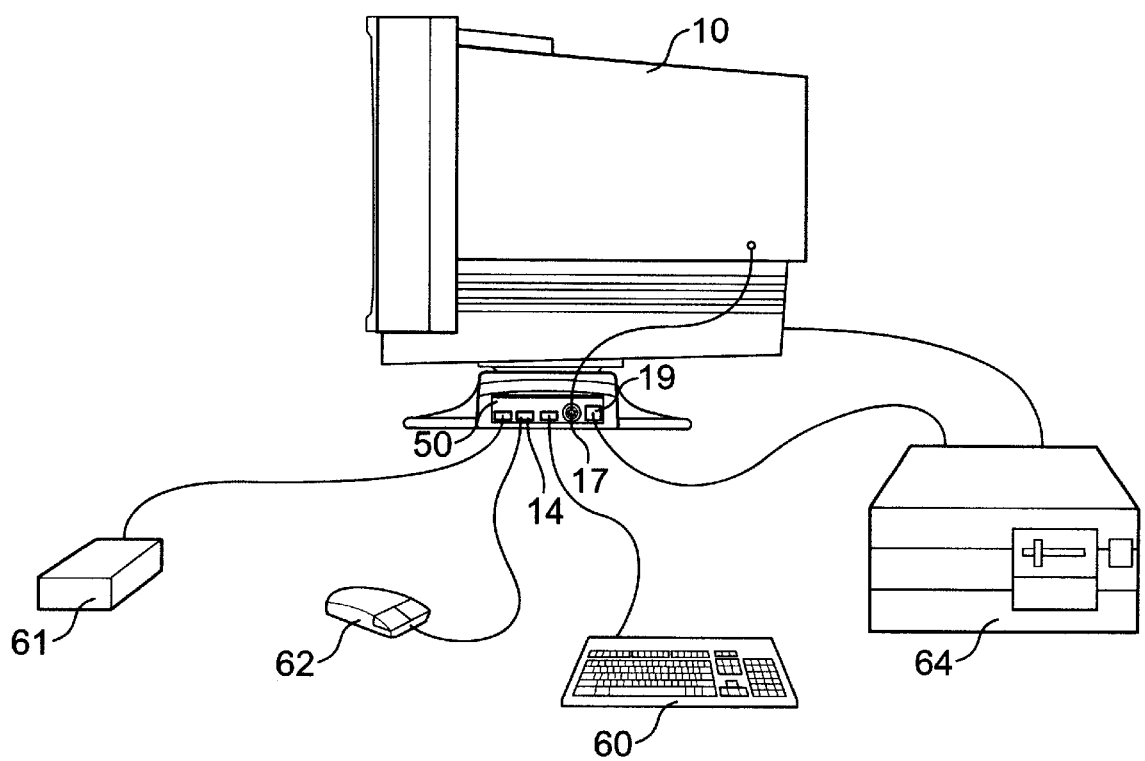
FIG. 7 and FIG. 7A together are a view showing a computer system with the USB hub mounted to the hub mount of the monitor stand according to the preferred embodiment of this invention.
Figure 7A:
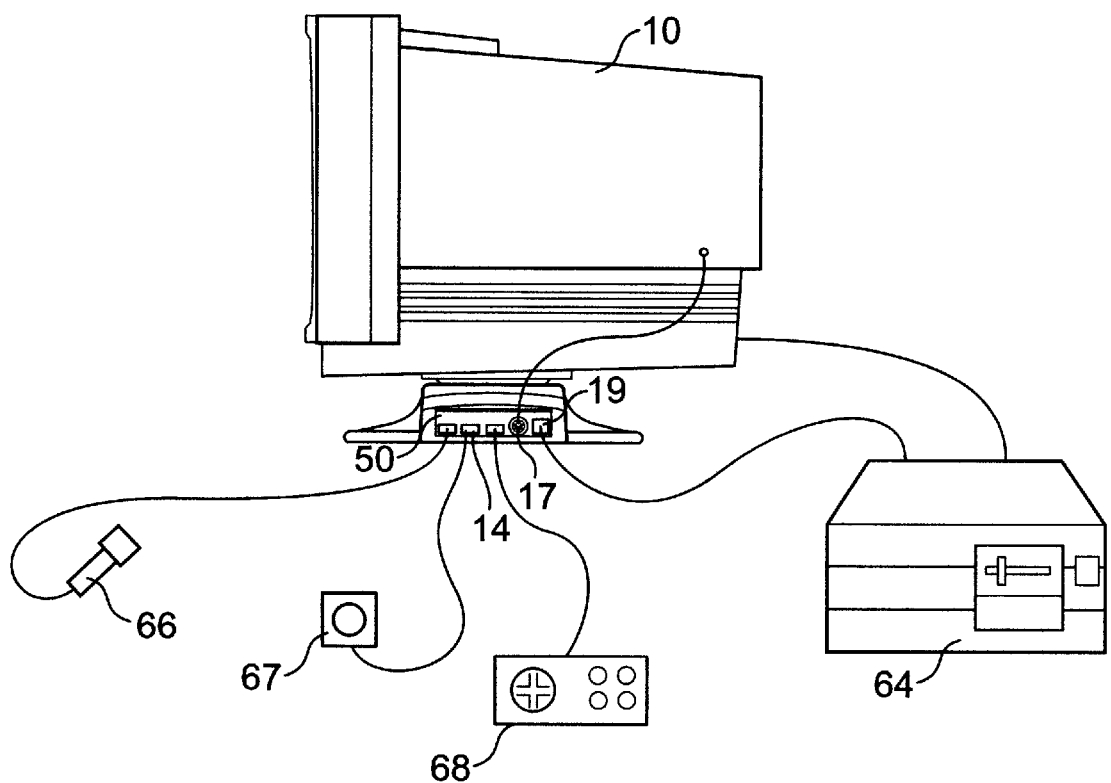

FIG. 7 is a view showing a computer system with the USB hub 50 mounted to the hub mount 20 of the monitor stand 12 according to this invention. As shown in FIG. 7, various peripheral equipment such as the keyboard 60, the modem 61, and the mouse 62 are connected to the USB hub 50 by inserting the connectors (not shown) of the peripheral equipment into the down-stream ports 14 of the mount 20. As shown in FIG. 7A, various other peripheral equipment such as a microphone 66, speaker 67, and a game pad 68 are connected to the USB hub 50 by inserting the connectors (not shown) of the peripheral equipment into the down-stream 14 of the mount 20.

As described above, the present invention provides a monitor stand, which is provided with a hub mount suitable for mounting a USB hub used for selectively connecting various peripheral equipment to a computer.

Another object of the present invention is to provide a monitor stand, which is provided with a hub mount suitable for selectively mounting a USB hub without disassembling a monitor or computer. In accordance with the monitor stand of this invention, the peripheral equipment may be easily added or changed by inserting or removing the connectors of the equipment into or from the down-stream ports of the USB hub without disassembling the computer. Therefore, the monitor stand with the hub mount of this invention effectively reduces the size of a monitor or computer.

In the present invention, the USB hub is selectively and detachably mounted to the hub mount of the monitor stand so that the monitor stand does not force the owner of a computer system, who may no require the use of a USB, to purchase the USB hub thus allowing the owner to save money. Another advantage of the invention resides in that it is possible to effectively use the lower space of a monitor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A monitor apparatus including a tilt support with a stand, said stand with a cavity therein for connection to a computer, said monitor apparatus comprising:

a universal serial bus hub disposed within said cavity;

an up-stream electrical port electrically connecting said computer, said computer controlling an overall operation of said universal serial bus hub;

a monitor disposed on top of said stand wherein said monitor may tilt with respect to said stand;

a monitor connection port electrically connecting said monitor to said universal serial bus hub;

a plurality of peripheral equipment located at a distance from said stand; and a plurality of down-stream electrical ports electrically connecting respective ones of said plurality of peripheral equipment to said universal serial bus hub.

2. The monitor apparatus of claim 1, further comprising a plurality holes having each hole aligned with each one of said up-stream electrical port said monitor connection port and said plurality of down-stream electrical ports; and said computer comprising a central processing unit.

3. The monitor apparatus of claim 1, with said plurality of peripheral equipment comprising a mouse, keyboard, telephone, modem, printer, microphone, speaker, scanner, and game pad.

4. The monitor apparatus of claim 1, with said universal serial bus hub comprising:

a top cover perforated by heat dissipating holes;

a bottom cover attaches to said top cover, said bottom cover perforated by heat dissipating holes; and a universal serial bus printed circuit board sandwiched between said top cover and said bottom cover.

5. The monitor apparatus of claim 4, with said universal serial bus hub disposed within said cavity of said stand.

6. The monitor apparatus of claim 1, with said stand being perforated by a plurality of heat dissipating holes.

7. The monitor apparatus of claim 4, with said top cover and said bottom cover forming an enclosure within said cavity of said stand when said top cover is attached to said bottom cover.

8. A monitor apparatus providing electrical connection to a computer and a plurality of peripheral devices, said monitor apparatus comprising:

a stand enclosing a cavity therein, said stand being located at a base;

a tilt support disposed on top of said stand;

a monitor disposed on top of said stand and attached to said tilt support, wherein said monitor may tilt with respect to said stand; and a universal serial bus hub disposed within said cavity of said stand, said universal serial bus hub providing electrical connections through cables to said monitor, said plurality of peripheral devices, and said computer.

9. The monitor apparatus of claim 8, with said stand being perforated by a first plurality of holes to accommodate electrical ports, said electrical ports to provide said electrical connections through said cables from said monitor, said plurality of peripheral devices, and said computer to said universal serial bus hub disposed within said stand.

10. The monitor apparatus of claim 9, with said universal serial bus hub comprising:

a top cover being perforated by a first plurality of notches that align up with said first plurality of holes in said stand to accommodate said electrical connections between said universal serial bus hub and said monitor, said plurality of peripheral devices, and said computer;

a bottom cover attaches to said top cover; and a universal serial bus printed circuit board sandwiched between said top cover and said bottom cover;

wherein said computer comprises a central processing unit.

11. The monitor apparatus of claim 9, with said computer controls an overall electrical operation.

12. The monitor apparatus of claim 11, with said universal serial bus hub comprising:

a top cover perforated by heat dissipating holes, said top cover being perforated by a first plurality of notches that align up with said first plurality of holes in said stand to accommodate said electrical connections between said universal serial bus hub and said monitor, said plurality of peripheral devices, and said computer;

a bottom cover attaches to said top cover, said bottom cover perforated by heat dissipating holes; and a universal serial bus printed circuit board sandwiched between said top cover and said bottom cover.

13. The monitor apparatus of claim 12, with said stand being perforated by a second plurality of holes for heat dissipation generated by said universal serial bus hub.

14. The monitor apparatus of claim 13, with said top cover and said bottom cover forming an enclosure within said cavity of said stand when said top cover is attached to said bottom cover.

15. The monitor apparatus of claim 14, with said plurality of peripheral devices comprising a mouse, keyboard, telephone, modem, printer, microphone, speaker, scanner and game pad.

16. A monitor apparatus having a tilt support and providing electrical connections to a computer and a plurality of peripheral devices, said monitor apparatus comprising:

a stand enclosing a cavity therein, said stand being located at a base, said stand being perforated by a plurality of holes to accommodate said electrical connections;

a monitor disposed on top of said stand and attached to said tilt support, wherein said monitor may tilt with respect to said stand;

a universal serial bus hub printed circuit board disposed within said cavity of said stand, said universal serial bus hub printed circuit board electrically connected with said electrical connections, said electrical connections connecting through cables to said monitor, said plurality of peripheral devices, and said computer, said computer being located remotely with respect to said monitor, said computer comprising a central processing unit; and a bottom cover supporting said universal serial bus hub printed circuit board and forming a bottom surface support of said stand.

17. The monitor apparatus of claim 16, with said computer electrically controls an overall operation of said universal serial bus hub printed circuit board, said plurality of peripheral devices, and said monitor.

18. The monitor apparatus of claim 17, with said swivel support being located between said top of said stand and said monitor.

19. The monitor apparatus of claim 17, with said plurality of peripheral devices comprising a mouse, keyboard, telephone, modem, printer, microphone, speaker, scanner and game pad.

20. The monitor apparatus of claim 19, further comprising a universal serial bus hub comprising:
  a top cover perforated by heat dissipating holes, said top cover being perforated by a first plurality of notches that align up with said plurality of holes in said stand to accommodate said electrical connections between said universal serial bus hub and said monitor, said plurality of peripheral devices, and said computer; said bottom cover attaches to said top cover, said bottom cover perforated by heat dissipating holes, said universal serial bus hub printed circuit board sandwiched between said top cover and said bottom cover.

21. A monitor apparatus for connecting peripheral devices and a computer, comprising:
  a monitor displaying variable images;
  a stand comprising:
    a top surface supporting the monitor and allowing the monitor to tilt with respect to the stand, the top surface having a cable hole accommodating a plurality of cables to pass through;
    a hub mount integrally formed with the top surface and having a cavity, comprising:
      a side wall having an upstream electrical port connecting the computer, a monitor connection port electrically connecting to the monitor, and a plurality of down-stream electrical ports electrically connecting the peripheral devices; and
      a boss formed on the hub mount;
  a top cover placed in the cavity of the hub mount, the top cover having a plurality of notches aligned with the upstream electrical port, the monitor port, and the plurality of down-stream electrical ports on the hub mount, the top cover having a plurality of stop protrusions formed on an interior side wall of the top cover;
  a universal serial bus printed circuit board seated in the top cover until the universal serial bus printed circuit board is stopped by the protrusion in the top cover, the universal serial bus printed circuit board electrically connected with the upstream electrical port, the monitor port, and the plurality of down-stream electrical ports on the hub mount;
  a bottom cover supporting the universal serial bus printed circuit board and forming a bottom surface support of the stand, the universal serial bus printed circuit board being secured to the bottom cover, the bottom cover positioned below the top cover with the universal serial bus printed circuit board being interposed between the bottom cover and the top cover; and
  a securing member fastening the bottom cover and the top cover to the hub mount of the stand by inserting the securing member through the bottom cover, through the top cover, and fastened to the boss of the hub mount of the stand.

22. The apparatus of claim 21, with the top cover perforated by heat dissipating holes, the bottom cover perforated by heat dissipating holes.

23. The apparatus of claim 22, with the hub mount of the stand being perforated by a plurality holes dissipating heat from the universal serial bus printed circuit board.

* * * * *